(12) United States Patent
Villa et al.

(10) Patent No.: US 8,973,096 B1
(45) Date of Patent: *Mar. 3, 2015

(54) FRAUD DETECTION IN ADAPTIVE AUTHENTICATION SYSTEMS

(71) Applicant: EMC Corporation, Hopkinton, MA (US)

(72) Inventors: Yael Villa, Tel Aviv (IL); Alon Kaufman, Herut (IL); Marcelo Blatt, Modiin (IL)

(73) Assignee: EMC Corporation, Hopkinton, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/089,862

(22) Filed: Nov. 26, 2013

Related U.S. Application Data

(63) Continuation of application No. 13/720,404, filed on Dec. 19, 2012, now abandoned, and a continuation-in-part of application No. 13/329,377, filed on Dec. 19, 2011, now Pat. No. 8,478,688.

(51) Int. Cl.
H04L 9/32 (2006.01)
H04L 29/06 (2006.01)

(52) U.S. Cl.
CPC .................................... H04L 63/123 (2013.01)
USPC ....................................... 726/2; 726/3; 726/4

(58) Field of Classification Search
CPC . H04L 63/08; H04L 63/1416; H04L 63/1425; H04L 63/1433; G06F 21/31; G06F 21/316; G06F 21/55; G06F 21/50
USPC .......... 726/11–13, 22–26, 1–7; 713/168–170; 705/64, 67, 75
See application file for complete search history.

(56) References Cited

U.S. PATENT DOCUMENTS

| | | | | |
|---|---|---|---|---|
| 7,856,494 B2 * | 12/2010 | Kulkarni et al. | ............... | 709/223 |
| 8,079,079 B2 * | 12/2011 | Zhang et al. | ................... | 726/19 |
| 8,180,873 B2 * | 5/2012 | Bhatt et al. | .................... | 709/223 |
| 8,370,266 B2 * | 2/2013 | Su | ................................... | 705/67 |
| 8,666,841 B1 * | 3/2014 | Claridge et al. | ........... | 705/26.35 |

* cited by examiner

*Primary Examiner* — Hosuk Song
(74) *Attorney, Agent, or Firm* — Krishnendu Gupta; Jason A. Reyes

(57) ABSTRACT

There is disclosed some techniques for processing an authentication request which includes a user identifier and current user data. In one example, the technique comprises receiving the authentication request at an adaptive authentication system which includes a database having a set of entries with each entry of the set of entries including an identifier and previous user data in connection with previous authentication requests. The adaptive authentication system constructed and arranged to perform an adaptive authentication operation on the authentication request as well as an unsupervised machine learning operation on the authentication request.

7 Claims, 3 Drawing Sheets

FRAUD DETECTION IN ADAPTIVE AUTHENTICATION SYSTEMS

RELATED APPLICATION

This application is a continuation of co-pending U.S. patent application Ser. No. 13/720,404, entitled FRAUD DETECTION IN ADAPTIVE AUTHENTICATION SYSTEMS, filed Dec. 19, 2012, which in turn was a continuation-in-part application claiming priority to U.S. patent application Ser. No. 13/329,377, filed Dec. 19, 2011, entitled RAPID TRANSACTION PROCESSING, the entirety of both patent application hereby incorporated by reference herein.

TECHNICAL FIELD

The present invention relates generally to techniques for detecting fraud in network communication systems.

BACKGROUND OF THE INVENTION

In today's high-tech, fast-paced, hyper-connected world, people are spending more and more time on the internet to complete more of their daily activities such as online banking and shopping. The convenience afforded by the access and availability of the online world, however, is not without drawbacks. This increased access has brought with it an unparalleled growth in online fraudulent activity.

Reports about identity takeover, filled with phrases like Trojan, Man in the Middle, Man in the Browser, and Phishing, are increasingly in the news. These emerging threats have triggered a growing awareness by service providers and customers alike. These threats are serious and must be addressed.

Service providers, such as financial institutions, trying to encourage customer activity while at the same time minimizing losses from financial fraud, are looking for ways to deal with these threats. One possible way is to use a risk-based authentication system with a risk engine associated therewith to assign risk scores to transactions. The transactions with a low risk score can be processed. Those transactions with a high risk score can be rejected or else a further step up challenge can be issued. For example, the risk-based authentication system can be configured to challenge a user to confirm their identity in order to allow a transaction to proceed.

At the end of a processing interval (e.g., at the end of each day), the service provider can update the risk engine with the results of manually investigated transactions. For example, the service provider may have manually discovered particular transaction attributes that closely correlate with fraudulent transactions, such as certain times of the day, certain IP addresses, and certain geographical locations. The financial institution can then have the risk engine tuned for the next processing interval so that future transactions having these particular transaction attributes are given higher risk scores by the risk engine.

However, the above process of identifying particular transaction attributes that closely correlate with fraudulent transactions is time consuming and expensive. A need therefore exists for techniques for improving a risk-based authentication system.

SUMMARY OF THE INVENTION

There is disclosed a technique that in one embodiment is directed to a method for use in processing an authentication request including a user identifier and current user data. The method comprising: receiving the authentication request at an adaptive authentication system which includes a database having a set of entries, each entry of the set of entries including an identifier and previous user data in connection with previous authentication requests, the adaptive authentication system being constructed and arranged to perform an adaptive authentication operation on the authentication request, the adaptive authentication system being further constructed and arranged to perform an unsupervised machine learning operation on the authentication request; performing the adaptive authentication operation on the authentication request, including: matching the user identifier of the authentication request with an identifier of a particular entry of the database; performing an analysis between the current user data associated with the authentication request and previous user data of the particular entry; and generating an authentication result based on the analysis, the authentication result indicating a likelihood of the authentication request being associated with fraudulent activity; and performing the unsupervised machine learning operation on the authentication request, including: evaluating the current user data and previous user data of the particular entry; identifying a feature of user authentication behavior in response to the evaluation of the current user data and previous user data of the particular entry; and based on the identified feature, adjusting the adaptive authentication system to form an adjusted adaptive authentication system such that an adaptive authentication operation performed by the adjusted adaptive authentication system on an authentication request similar to the received authentication request will generate a different authentication result.

Additionally, another embodiment of the technique is directed to a system for use in processing an authentication request. The system includes a network interface coupled to a network, a memory and a processor coupled to the memory, the processor configured to carry out the method of processing an authentication request.

Furthermore, a further embodiment of the technique is directed to a computer program product having a non-transitory computer readable storage medium which stores code including a set of instructions to process an authentication request.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION

There is disclosed herein a technique for use in processing an authentication request. The technique comprises receiving the authentication request at an adaptive authentication system which includes a database having a set of entries with each entry of the set of entries including an identifier and previous user data in connection with previous authentication requests. The adaptive authentication system is constructed and arranged to perform an adaptive authentication operation and an unsupervised machine learning operation. The technique performs the adaptive authentication operation by matching the user identifier of the authentication request with an identifier of a particular entry of the database, performing an analysis between the current user data associated with the authentication request and previous user data of the particular entry and generating an authentication result based on the analysis. The authentication result indicates a likelihood of the authentication request being associated with fraudulent activity. The technique performs the unsupervised machine learning operation on the authentication request by evaluating the current user data and previous user data of the particular entry, identifying a feature of user authentication behavior in response to the evaluation of the current user data and previous user data of the particular entry and adjusting the adaptive authentication system based on the identified feature to form an adjusted adaptive authentication system such that an adaptive authentication operation performed by the adjusted adaptive authentication system on an authentication request similar to the received authentication request will generate a different authentication result.

Figure 1:
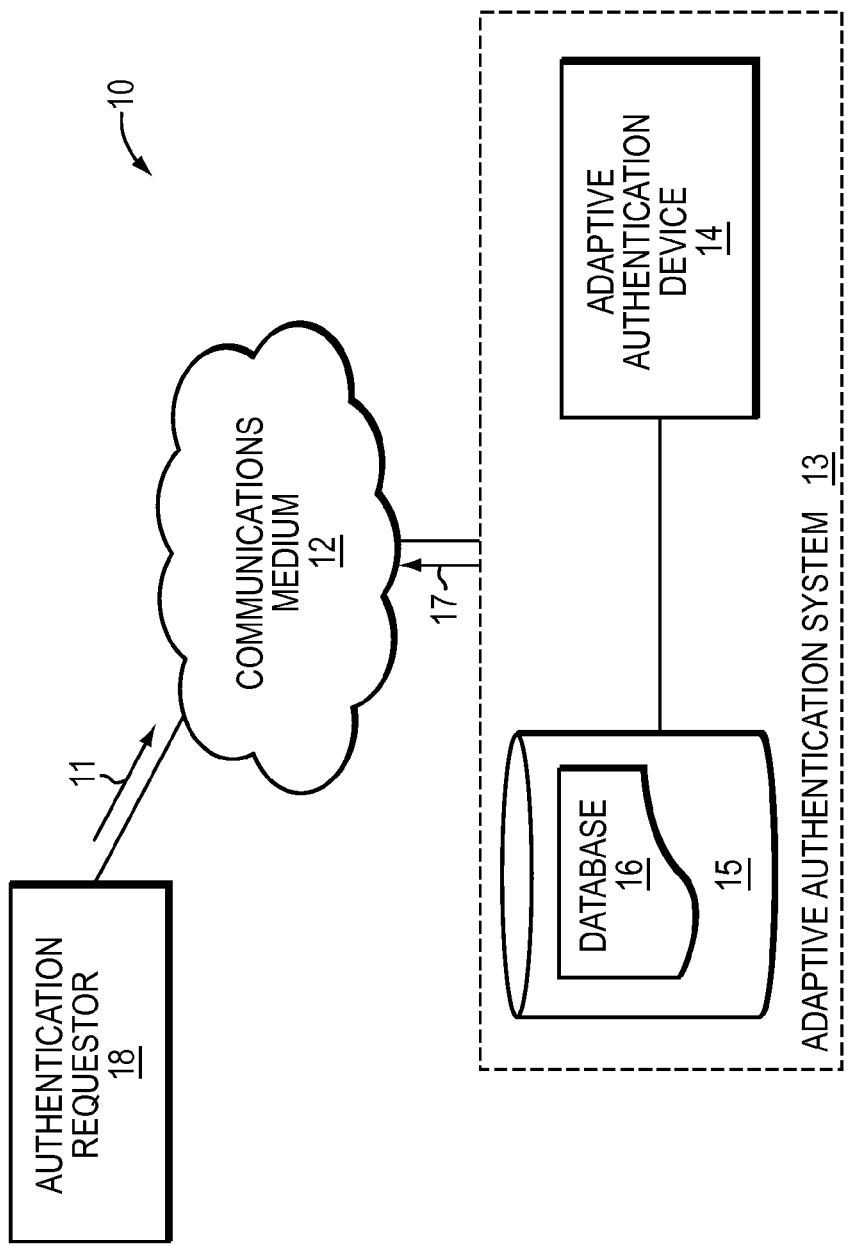
FIG. 1 is a schematic diagram illustrating an electronic environment for carrying out the technique.

Referring to FIG. 1, there is illustrated an electronic environment 10 for carrying out the technique. Electronic environment 10 includes communications medium 12, authentication requestor 18 and adaptive authentication system 13.

Communication medium 12 provides connections between adaptive authentication system 13 and authentication requestor 18. The communications medium 12 may implement a variety of protocols such as TCP/IP, UDP, ATM, Ethernet, Fibre Channel, combinations thereof, and the like. Furthermore, the communications medium 12 may include various components (e.g., cables, switches/routers, gateways/bridges, NAS/SAN appliances/nodes, interfaces, etc.). Moreover, the communications medium 12 is capable of having a variety of topologies (e.g., queue manager-and-spoke, ring, backbone, multi drop, point to-point, irregular, combinations thereof, and so on).

Authentication requestor 18 is constructed and arranged to receive requests from a user and to send a request 11 to authenticate the user to adaptive authentication system 13. Authentication requestor 18 is further constructed and arranged to receive an adaptive authentication result 17 which indicates whether the user is a high risk of being a fraudulent user.

Request 11 takes the form of a message that includes various facts and their values; such messages are embedded in a payload of a data packet. Request 11 will typically also include a username for the user and a timestamp indicating a time.

Adaptive authentication system 13 is constructed and arranged to receive authentication request 11 from authentication requestor 18. Adaptive authentication system 13 is also constructed and arranged to generate adaptive authentication result 17 based on request 11 and previous user authentication requests. Adaptive authentication system 13 is further constructed and arranged to send adaptive authentication result 17 to authentication requestor 18. Adaptive authentication system 13 is still further constructed and arranged to perform an unsupervised machine learning operation. Adaptive authentication system 13 includes adaptive authentication device 14 and storage device 15.

Storage device 15 is constructed and arranged to store database 16 which contains current and historical data in connection with previous authentication requests. Database 16 includes a set of entries, each entry of which includes a user identifier, a time period and user data.

Adaptive authentication device 14 is constructed and arranged to process authentication requests 11 according to the technique and takes the form of a desktop computer, laptop, server or tablet computer. Further detail concerning adaptive authentication device 14 are described below with regard to FIG. 2.

Figure 2:
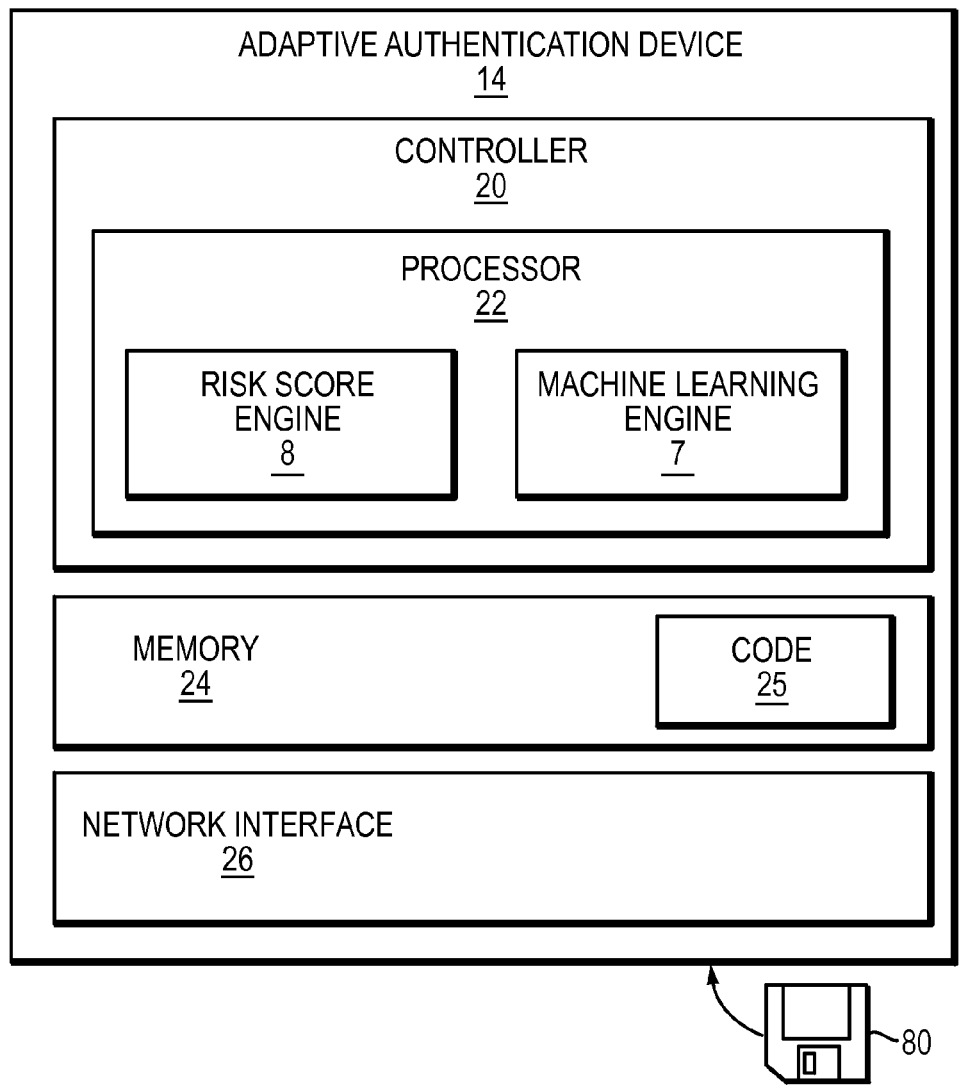
FIG. 2 is a schematic diagram illustrating an adaptive authentication device within the electronic environment shown in FIG. 1.

Referring to FIG. 2, there is illustrated some components of adaptive authentication device 14. Adaptive authentication device 14 includes a controller 20 which in turn includes a processor 22, a memory 24 and a network interface 26.

Memory 24 is configured to store code 25 which includes instructions to process authentication requests 11. Memory 24 generally takes the form of, e.g., random access memory, flash memory or a non-volatile memory.

Processor 22 takes the form of, but is not limited to, Intel or AMD-based MPUs, and can include a single or multi-cores each running single or multiple threads. Processor 22 is coupled to memory 24 and is configured to execute code 25 stored in memory 24. Processor 22 includes machine learning engine 7 and a risk score engine 8.

Machine learning engine 7 is constructed and arranged to evaluate user requests 11 and identify a feature of user authentication behavior from the current and previous data without any fraud feedback (i.e. unsupervised learning). Machine learning engine 7 is also constructed and arranged to store Bayesian weights in a memory accessible to risk score engine 8 and adjust the Bayesian weights in response to the identification of the feature of user authentication behavior from the current and previous data.

Risk score engine 8 is constructed and arranged to assign a risk score to a transaction based on the Bayesian weights stored in memory. Risk score engine 8 can also in some embodiments be constructed and arranged to store the assigned risk score for the transaction in storage device 15 and/or memory 24.

Network interface 26 is constructed and arranged to send and receive data over communications medium 12. Specifically, network interface 26 is configured to receive authentication request 11 from authentication requestor 18 over communications medium 12 and to send result 17 to the authentication requestor 18. Also, network interface 26 is constructed and arranged to receive data from storage device 15.

Returning to FIG. 1, storage device 15 is constructed and arranged to store database 9 which contains previous transaction data. Storage device 15 is further constructed and arranged to receive requests to access data from and send data to adaptive authorization device 14.

During operation, authentication requestor 18 sends request 11 to adaptive authentication device 14 via network interface 26. Processor 22 stores data such as the username, user data, such as fact or attribute values, and timestamp from request 11 in memory 24. Processor 22 accesses database 16 and performs a lookup operation on the username; that is, processor 22 compares the username to user identifiers in each entry of database 16 and chooses those entries having a user identifier which matches the username.

The lookup operation will result in one or more entries from database 16, each of whose user identifiers matches the username stored in memory 24. It should be understood that in at least one embodiment the entries can correspond to a time interval. The time intervals can be distinct and non-overlapping. For example, while one entry has a time interval which ends at the current time and began at 12 AM the previous Sunday, another entry has a time interval which ends at 11:59 PM the previous Saturday and begins at 12 AM the Sunday prior, and so on.

In some arrangements, in order to limit memory consumption in storage device 15, the number of entries having user identifiers matching the username is limited those having time intervals corresponding to the current time period and the four most recent previous time periods. Thus, returning to the above example, when at 12 AM Sunday processor 22 creates a new entry in database 16 having a user identifier matching the username, processor 22 also deletes a corresponding entry having a time interval which is five weeks older than the newly created entry.

Processor 22 then combines the attribute values stored in memory 24 with the attribute values in the entry of database 16 that corresponds to the current time interval. For a more detailed discussion of suitable Adaptive Authentication systems, see for example, U.S. patent application Ser. No. 13/246,937, filed Sep. 28, 2011, entitled "Using Baseline Profiles In Adaptive Authentication" and/or United States Patent Application entitled "Techniques for Authenticating Users of Massive Multiplayer Online Role Playing Games Using Adaptive Authentication," each incorporated by reference herein.

Figure 3:
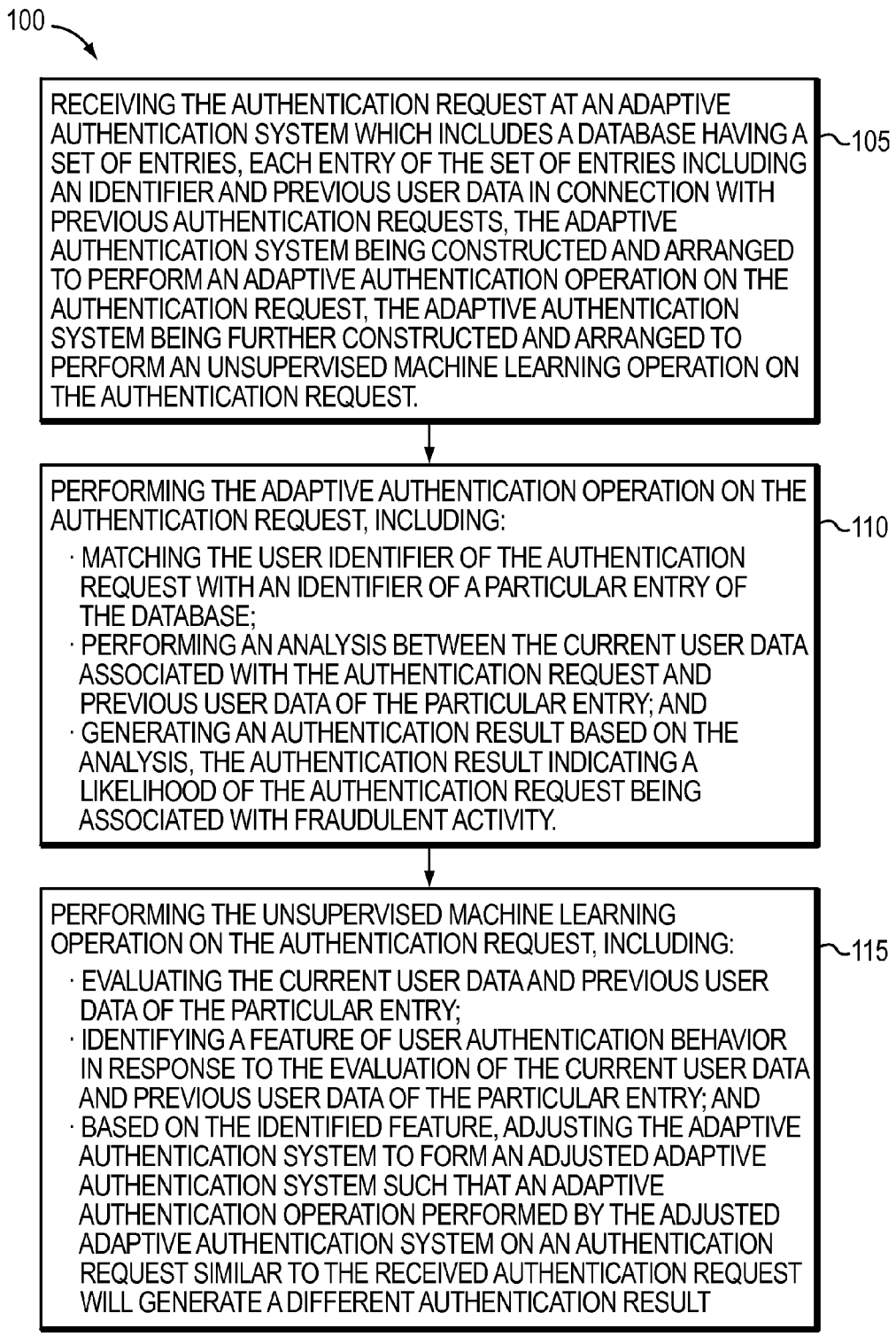
FIG. 3 is a flow chart illustrating a method of carrying out the technique within the electronic environment shown in FIG. 1.

Referring to FIG. 3, there is illustrated a flow chart describing an exemplary implementation of a method 100 of carrying out the technique within the electronic environment 10. In the flow diagram, the operations are summarized in individual blocks. The operations may be performed in hardware, or as processor-executable instructions that may be executed by a processor. Furthermore, the method 100 may, but need not necessarily, be implemented the electronic environment of FIG. 1.

It should be understood that in this embodiment the electronic environment 10 will include an adaptive authentication system 13 which includes a database 16 having a set of entries with each entry of the set of entries including an identifier and previous user data in connection with previous authentication requests. It should also be understood that the adaptive authentication system 13 will be constructed and arranged to perform an adaptive authentication operation on the authentication request 11. For example, the risk engine 8 in the adaptive authentication device 14 can perform the adaptive authentication operation. Additionally, it should be further understood the adaptive authentication system 13 will be constructed and arranged to perform an unsupervised machine learning operation on the authentication request 11. For example, the machine learning engine 7 in the adaptive authentication device 14 can perform the unsupervised machine learning operation.

At step 105, the method will receive the authentication request 11 at the adaptive authentication system 13. The request 11 will comprise a user identifier and user data. It should be understood that a user identifier can be any entity participating in the event such as a user or an IP; such an entity contains, for example, sub entities with which the entity interacts (e.g., payees, devices, IP addresses, etc.). The user data will include facts and/or attributes in connection with the request. For example, such attributes can include geo-location, time, etc.

It should be understood that the adaptive authentication system 13 can also receive another authentication request having a user identifier which is distinct from the user identifier of the authentication request. When performing the adaptive authentication operation on the other authentication request, the operation will match an entry having an identifier which matches the user identifier of the other authentication request but which is distinct from the particular entry.

At step 110, the method will perform the adaptive authentication operation on the authentication request 11. The operation performed by the risk engine 8 will include matching the user identifier of the authentication request 11 with an identifier of a particular entry of the database. It should be appreciated from the foregoing that the database 16 comprises a set of entries with each entry comprising a user identifier and corresponding user data. In some cases, the database 16 can comprise one or more entries for a user. For example, the database can have entries corresponding to time intervals. Therefore, the database 16 can in some embodiments have one entry for each time interval.

The adaptive authentication operation performed 110 by the risk engine 8 also includes performing an analysis between the current user data associated with the authentication request 11 and previous user data of the particular entry. For example, the user's geo-location, ISP address, etc. If the user data includes data relating to the geo-location of the user then the operation will perform an analysis between the current geo-location and the location of previous requests as matched in the database 16. Additionally, it should be appreciated that such operations may involve analyzing certain behavior characteristics of the user's sessions (e.g., a comparison of length of session, purchase habits, and other activities).

The adaptive authentication operation performed 110 by the risk engine 8 also includes generating an authentication result based on the analysis. The risk engine 8 will generate the authentication result 17 based on a set of Bayesian weights, each of which corresponds to an attribute associated with the current user data of the authentication request 11. It should be understood that the risk engine 8 can derive the value of each Bayesian weight from values of the attribute to which the Bayesian weight corresponds for previous authentication requests which are stored in database 16. The authentication result 17 will in this embodiment comprise a risk score indicating a likelihood of the authentication request being associated with fraudulent activity. The risk score forms part of a risk scale with one end of the scale representing a low risk and the other end representing a high risk of fraudulent activity.

It should also be understood that the adaptive authentication operation performed by the risk engine 8 can also optionally perform additional risk-based authentication operations. For example, the adaptive authentication device 14 can issue an out-of-band challenge to the user through an out-of-band device (not shown). The out-of-band challenge requires that the user provide an out-of-band response using the out-of-band device (e.g., a cell phone, email, SMS, etc.). In some arrangements, the challenge is a user specific question that only the user should be able to answer.

It should be further understood that the authentication result 17 will also be sent by the adaptive authentication device 14 to the authentication requestor 18. The result 17 can dictate whether the user authentication is approved or rejected.

At step 115, the method will perform the unsupervised machine learning operation on the authentication request 11. It should be understood that in this embodiment the unsupervised machine learning operation is performed after the adaptive authentication operation. In other words, the authentication result 17 is generated before the unsupervised machine learning operation. The unsupervised machine learning operation performed 115 by the machine learning engine 7 comprises evaluating the current user data and previous user data of the particular entry. The unsupervised machine learning operation performed 115 by the machine learning engine 7 also identifies a feature of user authentication behavior in response to the evaluation of the current user data and previous user data of the particular entry. It should be understood that the goal of evaluating and subsequently identifying a feature of user authentication behavior is to identify fraud patterns or to recognize unusual or abnormal user activities. For example, the machine learning engine 7 can evaluate in an unsupervised manner the attribute(s) associated with the user data and similar attribute(s) in the previous user data. As mentioned above, one of the attribute(s) can be the geo-location of the user. The identified feature of user authentication behavior can be the user sending requests from a new location. Another feature can be the user sending requests that are rejected from a particular geo-location. In such a case, the user may not be the real user but a fraudster.

The unsupervised machine learning operation performed 115 by the machine learning engine 7 also adjusts the adaptive authentication system based on the identified feature to form an adjusted adaptive authentication system such that an adaptive authentication operation performed by the adjusted adaptive authentication system on an authentication request similar to the received authentication request will generate a different authentication result. For example, the machine learning operation performed by the machine learning engine 7 can adjust a configuration of the risk engine 8 to form an adjusted risk engine in response to identifying the feature. It should be understood that in this embodiment the machine learning engine 7 adjusts the configuration of the risk engine 8 by increasing a value of a Bayesian weight of the set of Bayesian weights when the feature of user authentication behavior is associated with fraudulent behavior. Additionally, it should be understood that in this embodiment the machine learning engine 7 will adjust the configuration of the risk engine 8 by decreasing a value of a Bayesian weight of the set of Bayesian weights when the feature of user authentication behavior is associated with legitimate behavior.

It should be understood from the foregoing description that the adaptive authentication operation performed by the risk engine can match the user identifier of the authentication request 11 with an identifier of the particular entry of the database 16. It should also be understood that the operation can analysis one or more attributes associated with request 11 with a similar attribute in the entry in the database. For example, a location attribute can show the user sending requests from New York. If the particular entry in database base shows the user submitted requests from Tel Aviv in a particular time window ten times and two times from New York, then it should be understood that statistically the requests emanating from New York in the time window are increasing. Thus, the risk may be less in connection with this request from New York. Alternatively, if the request emanates from India the risk will be much greater as the user has not submitted a request from India in the past. It should be further understood that the machine learning operation may also adjust the Bayesian weight corresponding to the location attribute in response to the number of successful requests from New York increasing in this time window. It should be understood that the feature of sending legitimate requests from New York as well as Tel Aviv may be identified as the feature of user authentication behavior.

In another example, the request may emanate from Bangalore in India. The user has no history of submitting requests from India. The adaptive authentication operation may reject the request. The unsupervised machine learning operation may identify the rejection from Bangalore as an abnormal feature of user authentication behavior. The Bayesian weight in connection with the location attribute may be adjusted to take this into account.

It should be understood that the technique as described herein may be implemented in many ways. Additionally, the attribute(s) may be any distinctive characteristic of the authentication request. It should be understood that the location is given as an example only. For example, a user may submit a request for remote connection to a corporate VPN. It should be understood that in such an example the user data can relate to a plurality of attributes associated with the request. The attributes can be VPN user name, matching corporate name, employee status (e.g., active, non-active, contractor, non-activate contractor, unknown), ground speed calculated as the distance of the previous known place divided by the corresponding time difference, failed authentication (e.g., number of failed authentication this user had), connection denied, privileges changes (e.g., if the privileges of the user were enhances or not since it was provisioned in the system), disconnection reason, IP address, hostname, operating system, service package, MAC Address, MAC Vendor, country, office location, ASN (i.e., Autonomous System Umber is the name of the network the user is connecting from), time of day, session duration, time since previous session, open TCP ports. It should be understood that if one of the attributes is considered slightly risky the user can still be authentication because the other attributes may be considered less risky. This is one of the advantages of submitting multiple attributes.

While various embodiments of the invention have been particularly shown and described, it will be understood by those skilled in the art that various changes in form and details may be made therein without departing from the spirit and scope of the invention as defined by the appended claims.

Furthermore, it should be understood that some embodiments are directed to adaptive authentication device 14. Some embodiments are directed to a system which processes an authentication request. Some embodiments are directed to a method of processing an authentication request. Also, some embodiments are directed to a computer program product which enables computer logic to process an authentication request.

In some arrangements, adaptive authentication device 14 is implemented by a set of processors or other types of control/processing circuitry running software. In such arrangements, the software instructions can be delivered to adaptive authentication device 14 in the form of a computer program product (illustrated generally by code for computer program 80 stored within memory 24 in FIG. 2) having a computer readable storage medium which stores the instructions in a non-volatile manner. Alternative examples of suitable computer readable storage media include tangible articles of manufacture and apparatus such as CD-ROM, flash memory, disk memory, tape memory, and the like.

What is claimed is:

1. A method for use in processing an authentication request, the authentication request including a user identifier and current user data, the method comprising:

receiving the authentication request at an adaptive authentication system which includes a processor and a database, the database having a set of entries, wherein each entry of the set of entries includes an identifier and previous user data in connection with previous authentication requests, the adaptive authentication system being constructed and arranged to perform an adaptive authentication operation on the authentication request, the adaptive authentication system being further constructed and arranged to perform an unsupervised machine learning operation on the authentication request;

performing the adaptive authentication operation on the authentication request, including:
- matching the user identifier of the authentication request with an identifier of a particular entry of the database;
- performing an analysis between the current user data associated with the authentication request and previous user data of the particular entry; and
- generating an authentication result based on the analysis, the authentication result indicating a likelihood of the authentication request being associated with fraudulent activity; and performing the unsupervised machine learning operation on the authentication request, including:
- evaluating the current user data and previous user data of the particular entry;
- identifying a feature of user authentication behavior in response to the evaluation of the current user data and previous user data of the particular entry; and
- based on the identified feature, adjusting the adaptive authentication system to form an adjusted adaptive authentication system such that an adaptive authentication operation performed by the adjusted adaptive authentication system on an authentication request similar to the received authentication request will generate a different authentication result.

2. The method as claimed in claim 1, wherein the adaptive authentication system generates the authentication result based on a set of Bayesian weights, each of which corresponds to an attribute associated with the current user data of the authentication request.

3. The method as claimed in claim 2, wherein the adaptive authentication system can derive the value of each Bayesian weight from values of the attribute to which the Bayesian weight corresponds for previous authentication requests which are stored in database.

4. The method as claimed in claim 3, wherein the authentication result comprises a risk score indicating a likelihood of the authentication request being associated with fraudulent activity.

5. The method as claimed in claim 4, wherein the risk score forms part of a risk scale with one end of the scale representing a low risk and the other end representing a high risk of fraudulent activity.

6. The method as claimed in claim 5, wherein adjusting the adaptive authentication system to form the adjusted adaptive authentication system includes:
- increasing a value of a Bayesian weight of the set of Bayesian weights when the feature of user authentication behavior is associated with fraudulent behavior; and
- decreasing a value of a Bayesian weight of the set of Bayesian weights when the feature of user authentication behavior is associated with legitimate behavior.

7. The method as claimed in claim 1, further comprising:
- receiving, at the adaptive authentication system, another authentication request having a user identifier which is distinct from the user identifier of the authentication request; and
- performing the adaptive authentication operation on the another authentication request;
- wherein an entry having an identifier which matches the user identifier of the another authentication request is distinct from the particular entry.

* * * * *